US008094341B2

(12) United States Patent
Miyata

(10) Patent No.: US 8,094,341 B2
(45) Date of Patent: Jan. 10, 2012

(54) IMAGE FORMING APPARATUS, IMAGE FORMING METHOD, AND RECORDING SHEET

(75) Inventor: Yuji Miyata, Kitanagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 1130 days.

(21) Appl. No.: 11/607,074

(22) Filed: Dec. 1, 2006

(65) Prior Publication Data

US 2007/0139711 A1 Jun. 21, 2007

(30) Foreign Application Priority Data

Dec. 16, 2005 (JP) ................. 2005-363254

(51) Int. Cl.
*G06K 15/00* (2006.01)
*H04N 1/40* (2006.01)
*G06F 3/12* (2006.01)

(52) U.S. Cl. ....... 358/1.16; 358/3.28; 358/1.1; 235/432; 340/572.1; 340/686.1

(58) Field of Classification Search .......... 358/1.1, 358/1.2, 1.12, 1.13, 1.16, 3.28, 505, 401
See application file for complete search history.

(56) References Cited

U.S. PATENT DOCUMENTS 6,064,427 A * 5/2000 Shiota et al. ............. 348/96

| 2002/0170973 | A1* | 11/2002 | Teraura ............ 235/492 |
| 2004/0046999 | A1  | 3/2004  | Watanabe et al. |
| 2004/0100381 | A1* | 5/2004  | Waters ............ 340/568.1 |
| 2006/0028674 | A1* | 2/2006  | Lapstun et al. ....... 358/1.15 |

FOREIGN PATENT DOCUMENTS

| GB | 2404271 A | * | 1/2005 |
| JP | A 2004-072146 | | 3/2004 |
| JP | A 2004-142420 | | 5/2004 |
| JP | A 2005-041184 | | 2/2005 |
| WO | WO 2005/013192 A1 | | 2/2005 |

OTHER PUBLICATIONS

Notice of Reason(s) for Rejection issued in Japanese Patent Application No. 2005-363254; mailed Jun. 1, 2010; with English-language translation.

* cited by examiner

*Primary Examiner* — Thomas Lett
(74) *Attorney, Agent, or Firm* — Oliff & Berridge, PLC

(57) ABSTRACT

An image forming apparatus includes a printing unit, a positional information reader, and a first controller. The printing unit performs printing on a recording sheet based on print information. The positional information reader reads positional information with regard to a first storing medium from a second storing medium. The first and the second medium are provided to the recording sheet. The first controller controls the printing unit based on the positional information, read by the positional information reader, so as to print an image, corresponding to the print information, in a position on a recording sheet according to the positional information.

14 Claims, 13 Drawing Sheets

| TAG NUMBER | TAG POSITION | PRINT POSITION |
|---|---|---|
| 1 | (550, 800) | (50,50) - (1050,1550) |
| 2 | (1550, 800) | (1050,50) - (2050,1550) |
| 3 | (2550, 800) | (2050,50) - (3050,1550) |
| 4 | (550, 2300) | (50, 1550) - (1050, 3050) |
| 5 | (1550, 2300) | (1050, 1550) - (2050, 3050) |
| 6 | (2550, 2300) | (2050, 1550) - (3050, 3050) |
| 7 | (550, 3800) | (50, 3050) - (1050, 4550) |
| 8 | (1550, 3800) | (1050, 3050) - (2050, 4550) |
| 9 | (2550, 3800) | (2050, 3050) - (3050, 4550) |

| TAG NUMBER | TAG POSITION | PRINT POSITION |
|---|---|---|
| 1 | (550, 800) | (50, 50) - (1050, 1550) |
| 2 | (1550, 800) | (1050, 50) - (2050, 1550) |
| 3 | (2550, 800) | (2050, 50) - (3050, 1550) |
| 4 | (550, 2300) | (50, 1550) - (1050, 3050) |
| 5 | (1550, 2300) | (1050, 1550) - (2050, 3050) |
| 6 | (2550, 2300) | (2050, 1550) - (3050, 3050) |
| 7 | (550, 3800) | (50, 3050) - (1050, 4550) |
| 8 | (1550, 3800) | (1050, 3050) - (2050, 4550) |
| 9 | (2550, 3800) | (2050, 3050) - (3050, 4550) |

IMAGE FORMING APPARATUS, IMAGE FORMING METHOD, AND RECORDING SHEET

CROSS-REFERENCE TO RELATED APPLICATIONS

This application claims the benefit of Japanese Patent Application No. 2005-363254 filed Dec. 16, 2005 in the Japan Patent Office, the disclosure of which is incorporated herein by reference.

BACKGROUND

This invention relates to an image forming apparatus, an image forming method, wherein printing is performed on a recording sheet based on print information, and relates to the recording sheet. Particularly, this invention relates to a recording sheet, provided with a storing medium, an image forming apparatus, and an image forming method wherein such recording sheet can be used.

Recently, a technology has been introduced wherein a storing medium, such as a RFID (radio frequency identification) tag, is provided to a recording sheet. In an image forming apparatus, wherein such recording sheet can be used, an index image, such as a thumbnail, is printed on the recording sheet based on print information, and the print information is stored in the storing medium provided to the recording sheet. In this case, the content of the print information, stored in the storing medium, can be briefly checked by the thumbnail.

SUMMARY

However, in order to print the image, checked by the thumbnail, based on print information of the original image of the thumbnail printing is performed based on all the print information stored in the storing medium. Alternatively, the print information, stored in the storing medium, needs to be read by a personal computer or the like, and a desired image should be selected for normal printing. In the first case, recording sheets are wasted because undesired images are also printed. In the second case, an extra process is required wherein print information is read by a personal computer or the like, and desired information is selected.

In consideration of the above and other problems, one aspect of the present invention may be to provide a technique wherein an image, checked by an index image, such as a thumbnail, can be easily printed, without wasting recording sheets. Such printing is performed based on print information of an original image of the index image by an image forming apparatus and an image forming method, wherein a recording sheet provided with a storing medium can be used. It is to be noted that the image, referred in the present invention, is not limited to a graphic figure corresponding to image data. The image, referred herein, also includes letters corresponding to text data, code date, and the like.

In one aspect of the present invention, an image forming apparatus includes a printing unit, a positional information reader, and a first controller. The printing unit performs printing on a recording sheet based on print information. The positional information reader reads positional information with regard to a first storing medium from a second storing medium. The first and the second medium are provided to the recording sheet. The first controller controls the printing unit based on the positional information, read by the positional information reader, so as to print an image, corresponding to the print information, in a position on a recording sheet according to the positional information.

In the above-described image forming apparatus according to the present invention, when positional information is read from the second storing medium of the recording sheet by the positional information reader, the first controller controls the printing unit. As a result, an image, corresponding to the print information, is printed in a position on a recording sheet according to the positional information.

Therefore, if print information regarding an image is stored in the first storing medium disposed in a position corresponding to the print position of the image, a desired image can be easily printed based on the above-described print information without wasting recording sheets.

In another aspect of the present invention, an image forming method is suggested for performing printing on a recording sheet including a first storing medium and a second storing medium. In the first storing medium, print information can be stored. In the second storing medium, positional information regarding the first storing medium can be stored. The method includes steps of: reading the positional information stored in the second storing medium; and performing first printing. In the first printing step, an image, corresponding to the print information, is printed in a position according to the positional information read in the positional information reading step.

In the above-described image forming method according to the present invention, when the positional information is read from the second storing medium of the recording sheet in the positional information reading step, an image corresponding to the print information can be printed, in the first print step, in a position on a recording sheet according to the above-described positional information.

Therefore, if print information regarding an image is stored in the first storing medium disposed in the print position of the image, a desired image can be easily printed by reading the print information from the first storing medium and by printing the image.

In another aspect of the present invention, a recording sheet includes a surface on which an image, corresponding to the print information, can be printed as an index image; and a first storing medium. In the first storing medium, the print information can be stored. The first storing medium is disposed in a position so as to be related to a print position of the index image.

On the above-described recording sheet according to the present invention, a first storing medium, wherein print information can be stored, is disposed in a position related to the print position of an index image corresponding to print information. Therefore, if an index image is printed, and print information of an original image of the index image is stored in a first storing medium disposed in relation to the print position of the index image, printing can be easily performed by reading the print information of the above-described original image from the first storing medium without wasting recording sheets.

BRIEF DESCRIPTION OF THE DRAWINGS

The invention will now be described below, by way of example, with reference to the accompanying drawings, in which.

DETAILED DESCRIPTION OF THE PREFERRED EMBODIMENT

An embodiment of the present invention will now be described by way of example with the accompanying drawings. It is to be noted that the present invention is not limited to the following embodiments. Variations and modifications are possible within the technical scope of the invention.
[Structure of Printer 1]

Figure 1:
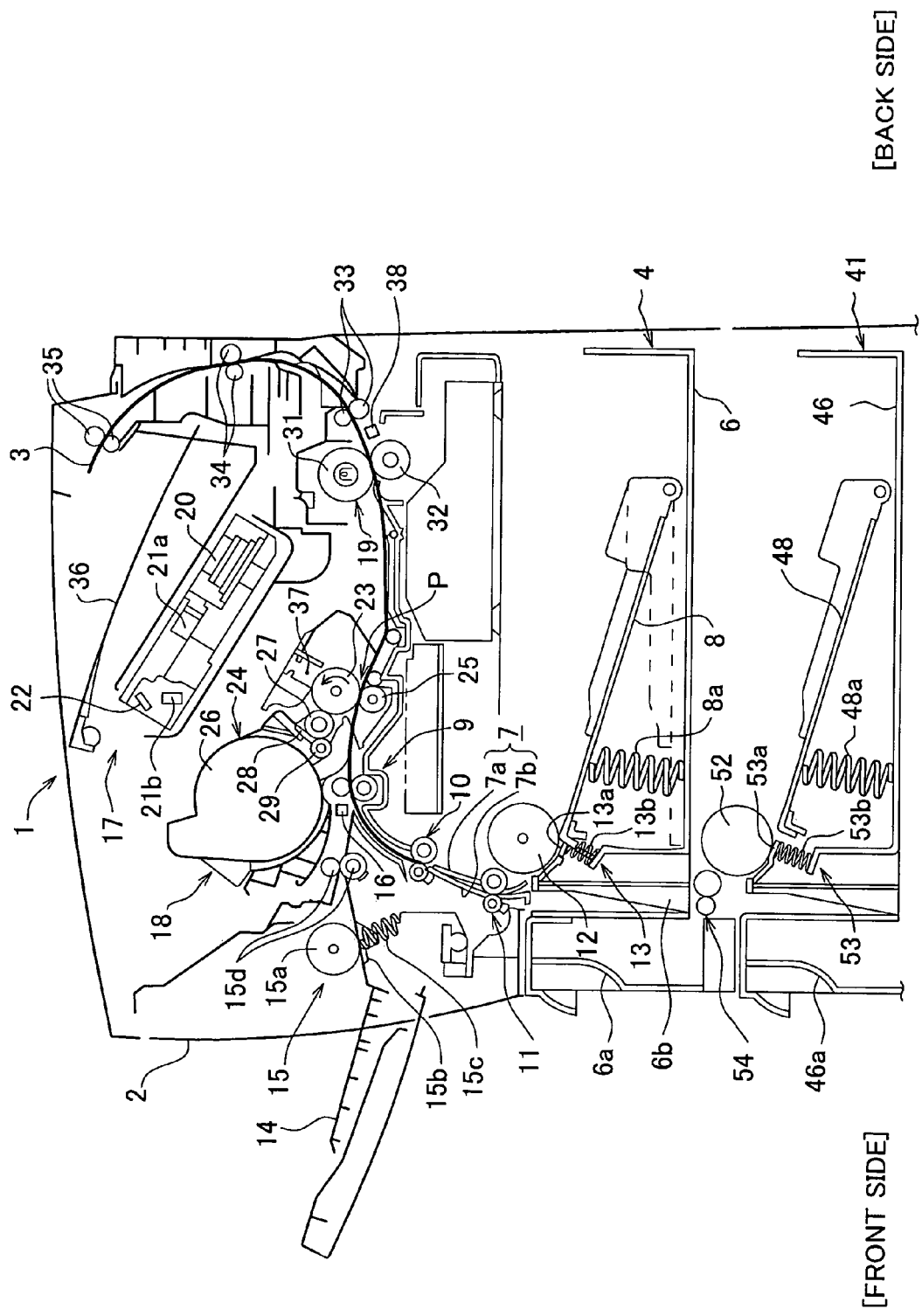
FIG. 1 is a sectional view showing an overall structure of a printer according to an embodiment to which the present invention is applied.

Referring to FIG. 1, a printer 1 according to the present embodiment includes, within a case 2, a feeder unit 4, a multi-purpose tray 14, a process unit 18, and a fixation device 19. The feeder unit 4 is provided for feeding a recording sheet 3, such as bond paper. The process unit 18 is disposed for forming an image on the recording sheet 3 when the recording sheet 3 is fed thereto. The printer 1 is configured such that an optional tray 41 can be additionally disposed under the feeder unit 4. One side of the printer 1 from which the multi-purpose tray 14 is installed into the case 2 (the left side in FIG. 1) is referred to as a "front side". Another side of the printer 1 (the right side in FIG. 1) opposing to the front side is referred to as a "back side".
[Structure of Feeder Unit 4]

As shown in FIG. 1, the feeder unit 4 includes, in the bottom portion of the case 2, a main feed tray 6, a pressure plate 8, a feed roller (to be referred to as main feed roller) 12, and a separation pad 13. The main feed tray 6 can be attached/detached to/from the bottom portion of the case 2. The pressure plate 8 is disposed inside of the main feed tray 6. The main feed roller 12 is disposed above one end of the main feed tray 6. A curved conveyance path 7 is provided between the main feed roller 12 and an image formation position P (an contact position of a photoreceptor drum 23 and a transfer roller 25, that is a transfer position wherein a toner image on the photoreceptor drum 23 is transferred onto the recording sheet 3).

The pressure plate 8 can hold a plurality of recording sheet 3 in a stacked manner. One end of the pressure plate 8 away from the main feed roller 12 is rotatably supported so that another end in vicinity of the main feed roller 12 can be moved in an up-and-down direction. The pressure plate 8 is biased upward by a spring 8a attached to the back side thereof. The separation pad 13 is disposed so as to face the main feed roller 12. A pad 13a, made of a member having a large friction coefficient, is pressed by a spring 13b toward the main feed roller 12.

The conveyance path 7 is formed in a curved manner with a pair of guide plates 7a and 7b which guide a surface of the recording sheet 3. Along the conveyance path 7, in the order from the upstream side of a direction for conveying the recording sheet 3, the main feed roller 12, a pair of conveyance rollers 11, a pair of conveyance rollers 10, and a pair of registration rollers 9 are disposed with some intervals therebetween. The conveyance rollers 11 and 10 respectively have a driving roller and a driven roller. The registration rollers 9 are disposed immediately before the image formation position P, and constituted with a driving roller and a driven roller.

In the feeder unit 4 configured as above, the recording sheet 3 stacked on the top on the pressure plate 8 is pressed toward the main feed roller 12, sandwiched by the main feed roller 12 and the separation pad 13 as the main feed roller 12 is rotated, and fed in a sheet-by-sheet manner. Subsequently, the recording sheet 3 is conveyed by the conveyance rollers 11, the conveyance rollers 10, and then by the registration rollers 9. The recording sheet 3 is conveyed to the image formation position P by driving the registration rollers 9 at a predetermined timing.
[Structure of Multi-purpose Tray 14]

In the front side of the case 2 above the feeder unit 4, the multi-purpose tray 14, and a paper feed mechanism 15 are disposed. The multi-purpose tray 14 is used so as to supply the recording sheet 3 by manual or automatic feed. The paper feed mechanism 15 is provided so as to feed the recording sheets 3 stacked on the multi-purpose tray 14. The paper feed mechanism 15 includes a paper feed roller 15a and a paper feed pad 15b. The paper feed pad 15b is pressed toward the paper feed roller 15a by a spring 15c disposed in the back side of the paper feed pad 15b. The paper feed mechanism 15 further includes a pair of conveyance rollers 15d constituted with a driving roller and a driven roller.

In the multi-purpose tray 14 configured as above, the recording sheet 3, stacked on the top on the multi-purpose tray 14, is sandwiched by the paper feed roller 15a and the paper feed pad 15b, and then, as the paper feed roller 15a is rotated, fed in the sheet-by-sheet manner toward the above-described registration rollers 9 via the conveyance rollers 15d.

Along the conveyance path 7 before the registration rollers 9, a tag reader 16 is disposed. When a recording sheet 300 (see FIG. 3) provided with a RFID tag (to be referred to as a layout tag) 302, which is a storing devices, is conveyed, the tag reader 16 reads data written in the layout tag 302. Therefore, when the recording sheet 300 is fed from one of the main feed tray 6, the multi-purpose tray 14, and an additional paper feed tray 46 (to be described hereinafter), and conveyed to a registration position, wherein paper conveyance is performed by the registration rollers 9, data can be read from the layout tag 302 provided on the recording sheet 300.

Figure 3:
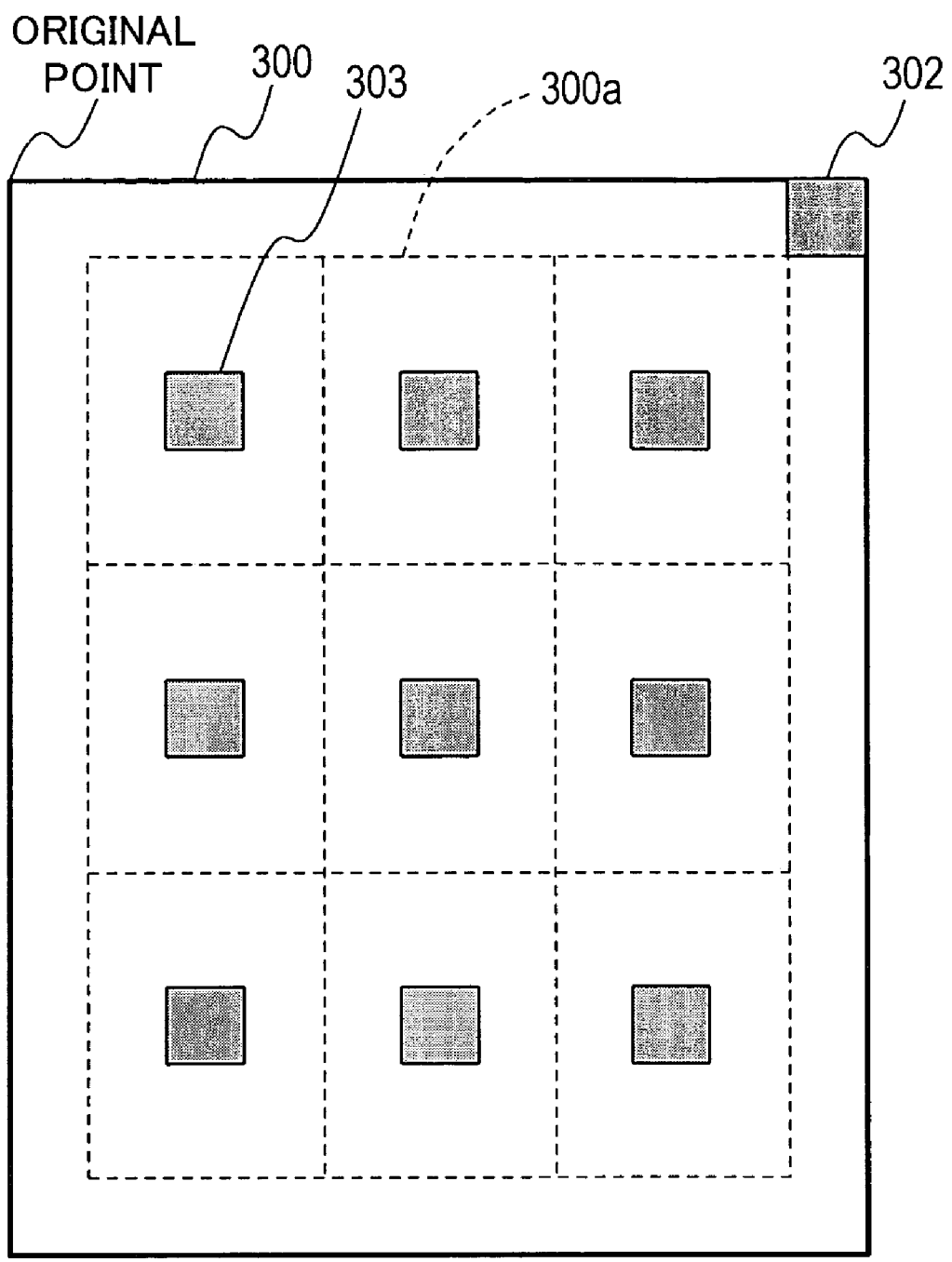
FIG. 3 is a plan view showing an example of a recording sheet used in the printer according to the embodiment.

As shown in FIG. 3, a plurality (3×3=9, in FIG. 3) of printing areas 300a for thumbnails print is provided on the surface of the recording sheet 300. A thumbnail is a reduced image so as to briefly check what an image looks like. In the center of respective areas 300a, a RFID tag (to be referred to as an image tag) 303, which is a storing medium, is disposed wherein print data of an original image of an index image can be stored. It is to be noted that the index image and the original image thereof, mentioned in the present embodiment, are not limited to a graphic figure corresponding to image data. The index image and the original image also include letters corresponding to text data, code date and so on. The layout tag 302 is disposed at the top right end of the recording sheet 300, and stores information including the position of the respective image tags 303. Data processing by using the tags 302 and 303 will be described later.

[Structure of Scanner Unit 17]

Referring again to FIG. 1, a scanner unit 17 is disposed in the upper portion of the case 2 under a discharge tray 36. The scanner unit 17 includes a laser emission portion (not shown), a polygon mirror 20, lenses 21a and 21b, and a reflection mirror 22. The polygon mirror 20 is driven and rotated. Laser beam is emitted from the laser emission portion according to image data. The laser beam is first reflected on the polygon mirror 20, passes through the lens 21a, is reflected on the reflection mirror 22, and then passes through the lens 21b. The laser beam is irradiated on the surface of the photoreceptor drum 23 in the process unit 18 in a rapid scanning manner.

[Structure of Process Unit 18]

The process unit 18 includes a drum cartridge and a developing cartridge 24. The drum cartridge includes the photoreceptor drum 23, which is an electrostatic latent image holder, a scorotron-type charger 37, and the transfer roller 25. The developing cartridge 24 can be attached/detached to/from the drum cartridge, and includes a toner storage portion 26, a development roller 27, a thick restricting blade 28, and a toner supply roller 29.

In the toner storage portion 26, polymerized toner, which is positive electric and non-magnetic monocomponent, is filled as a developer. The toner is supplied to the development roller 27 by the toner supply roller 29. On this occasion, the toner is positively charged by friction between the toner supply roller 29 and the development roller 27. When the toner is supplied onto the development roller 27, the toner is spread into a thin layer, having a uniform thickness, by the thick restricting blade 28 corresponding to the rotation of the development roller 27, and maintained on the development roller 27. On the other hand, the photoreceptor drum 23 is disposed so as to face the development roller 27. The main body of the drum 23 is grounded. The surface of the main body of the drum 23 is formed with an organic photoreceptive material, such as a positive electric photoreceptive layer constituted with polycarbonate or the like.

In the printer 1, residual toner, left on the surface of the photoreceptor drum 23 after a toner image is transferred by the transfer roller 25 onto the recording sheet 3, is collected by a so-called cleaner-less system wherein the residual toner is collected by the development roller 27. In case residual toner on the surface of the photoreceptor drum 23 is collected by the cleaner-less system, a cleaner device, such as a blade, and a reservoir for waste toner do not have to be provided. Therefore, the structure of the apparatus can be simplified and downsized. The cost for the apparatus can be also reduced.

The scorotron-type charger 37 is disposed above the photoreceptor drum 23 with a predetermined space therebetween so that the scorotron-type charger 37 does not contact with the photoreceptor drum 23. The scorotron-type charger 37 generates corona discharge from a charge wire, such as tungsten wire, for positive charging, and is configured so as to positively charge the surface of the photoreceptor drum 23 in a uniform manner.

As the photoreceptor drum 23 is rotated, the surface of the photoreceptor drum 23 is, first positively charged in the uniform manner by the scorotron-type charger 37, and exposed to rapid scan of the laser beam from the scanner unit 17. As a result, an electrostatic latent image is formed on the surface of the photoreceptor drum 23 based on image data.

Subsequently, as the development roller 27 is rotated and when the toner, maintained on the development roller 27 and positively charged, faces the photoreceptor drum 23 and comes into contact therewith, the toner is supplied to the electrostatic latent image. That is, toner is supplied to an exposed portion of the surface of the photoreceptor drum 23 wherein electric potential is decreased due to an exposure to the laser beam. By the toner being selectively maintained on the surface of the photoreceptor drum 23, a visible image, i.e. a toner image, can be obtained.

The transfer roller 25 is disposed beneath the photoreceptor drum 23 so as to face the photoreceptor drum 23. The transfer roller 25 is supported in the above-described drum cartridge, shown in FIG. 1, so as to be rotatable in a clockwise direction. The transfer roller 25 includes a metal roller shaft, and a roller made of an ionic conductive rubber material and covering the shaft. When transfer is performed, transfer bias is applied (in a transfer order) to the transfer roller 25 from an electric source for applying transfer bias. Therefore, the toner image maintained on the surface of the photoreceptor drum 23 is transferred onto the recording sheet 3 at the above-described image formation position P while the recording sheet 3 passes through between the photoreceptor drum 23 and the transfer roller 25.

[Structure of Fixation Device 19]

The fixation device 19 is disposed, as shown in FIG. 1, in a downstream side of the conveyance direction with respect to the process unit 18. The fixation device 19 includes a heat roller 31, a pressure roller 32, and a pair of conveyance rollers 33. The pressure roller 32 is disposed so as to press the heat roller 31. The pair of the conveyance rollers 33 are disposed in the downstream side of the heat roller 31 and the pressure roller 32. The heat roller 31 includes a metal (e.g. aluminum) heater for heating, such as a halogen lamp. The heat roller 31 fixates the toner, transferred onto the recording sheet 3 in the process unit 18, by using heat, while the recording sheet 3 passes through between the heat roller 31 and the pressure roller 32. The recording sheet 3 is further conveyed by the conveyance rollers 33, 34 and the discharge rollers 35 disposed along a discharge path, formed in the back side in the case 2, and then discharged onto the discharge tray 36.

Along a conveyance path of the recording sheet 3 formed between the heat roller 31 and the pressure roller 32 and between the conveyance rollers 33, pluralities of tag writers 38 are aligned in a direction perpendicular to a direction in which the conveyance path extends. The tag writers 38 can write data in the image tags 303, in a case wherein the above-described recording sheet 300 is used as the recording sheet 3. Therefore, when the recording sheet 300 is used, desired data can be written in the image tags 303 of the recording sheet 300 on which an image has been formed.

Figure 2:
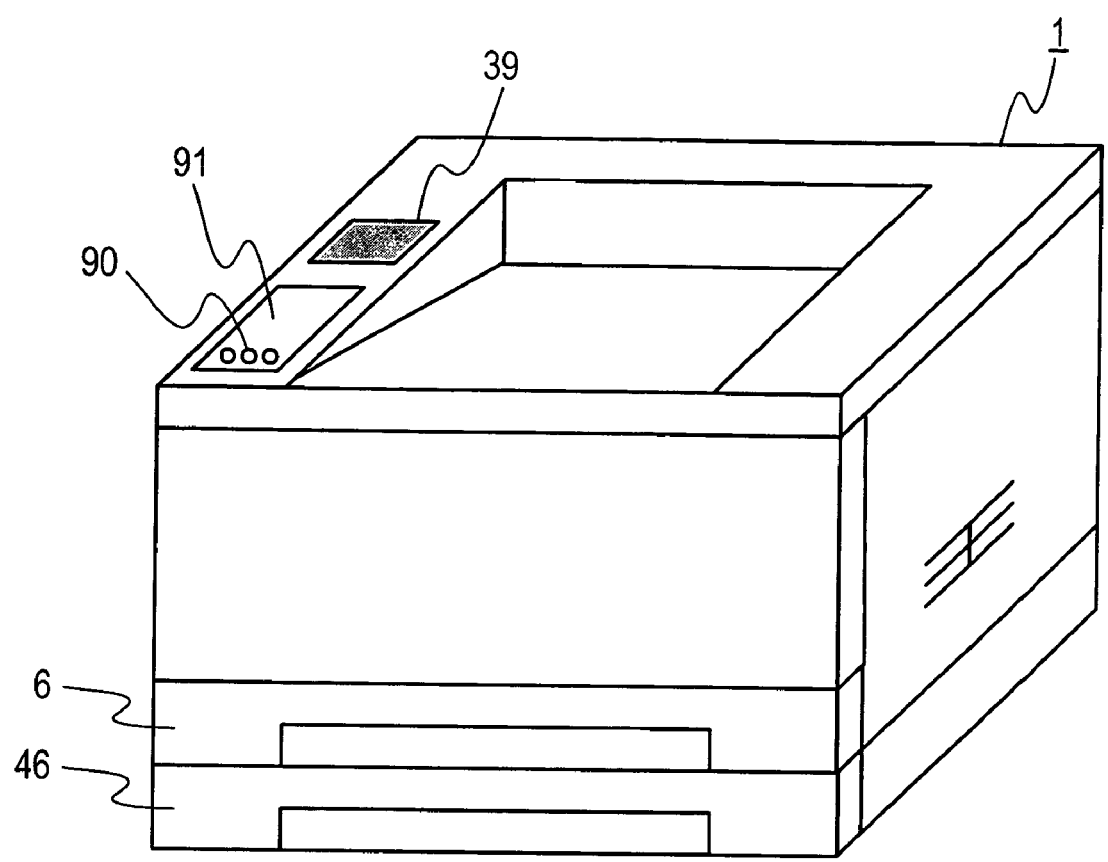
FIG. 2 is a perspective view showing an exterior appearance of the printer according to the embodiment.

Furthermore, as shown in FIG. 2, on the top surface of the case 2, a tag reader 39 is disposed for reading data written in the image tags 303. Therefore, when the image tags 303 are placed over the tag reader 39, data can be read from the image tags 303.

[Structure of Optional Tray 41]

Referring again to FIG. 1, the optional tray 41, which can be installed beneath the feeder unit 4, is configured so as to have approximately the same internal structure as that of the feeder unit 4. That is, the optional tray 41 includes an additional feed tray 46, a pressure plate 48, a feed roller (to be referred to as additional feed roller) 52, and a separation pad 53. The additional feed tray 46 can be attached/detached to/from the bottom portion of the optional tray 41. One end of the pressure plate 48 is rotatably supported on the bottom surface of the additional feed tray 46, and energized by a spring 48a. The additional feed roller 52 is disposed above another end of the pressure plate 48. The separation pad 53 is disposed so as to face the additional feed roller 52, and pressed toward the additional feed roller 52 by a spring 53b pressing a pad 53a made of a member having a large friction coefficient.

In one part of the main feed tray 6, inserted into the feeder unit 4, a path 6b is formed between a rotation area of the pressure plate 8 and a handle portion 6a disposed in the front side of the main feed tray 6. In the path 6b, the recording sheet 3 can pass in the vertical direction. Beneath the path 6b, a pair of conveyance rollers 54, constituted with a driving roller and a driven roller, is disposed. Therefore, when the main feed tray 6 of the feeder unit 4 is placed in a normal position (in which the recording sheet 3 can be fed to the conveyance path 7 by the main feed roller 12), the recording sheet 3, fed from the optional tray 41 by the additional feed roller 52 in the sheet-by-sheet manner, is conveyed by the pair of the conveyance rollers 54, passes through the path 6b, and then conveyed into the conveyance path 7 by the conveyance rollers 11. In the front side of the additional feed tray 46, a handle 46a is disposed in the same manner as in the feeder unit 4.

[Control System of Printer 1]

Figure 4:
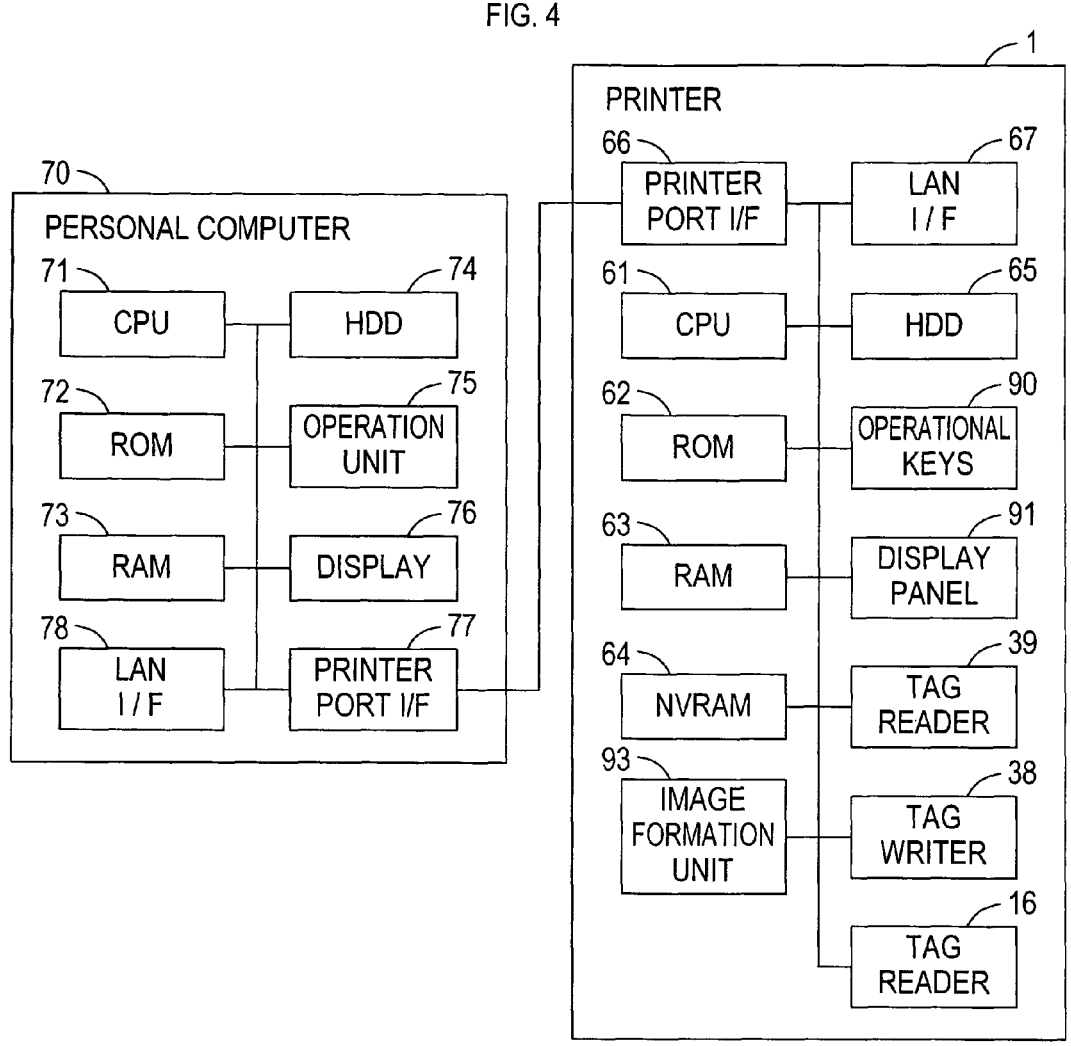
FIG. 4 is a block diagram showing the structure of a control system of the printer according to the embodiment.

Referring now to FIG. 4, the printer 1 includes a CPU (Central Processing Unit) 61, a ROM (Read-Only Memory) 62, and a RAM (Random Access Memory) 63. The CPU 61 performs various operations. The ROM 62 stores control programs and the like. The RAM 63 temporarily stores various data. The CPU 61 is connected to a NVRAM 64, a hard disc device (HDD) 65, and so on. The NVRAM 64 stores data so that the data is not erased even when a power source switch is turned off. The CPU 61 is furthermore connected to a printer port interface (printer port I/F) 66, a LAN interface (LAN I/F) 67, operation keys 90, a display panel 91 (see FIG. 2), the above described tag writer 38, the tag readers 16, 39, and various actuators in the mechanisms between respective feed rollers 12, 15a, 52 and the discharge rollers 35 (to be generically referred to as an image formation unit 93). The printer port I/F 66 is used so as to connect the printer 1 to an external device, i.e. a personal computer (to be referred to as PC) 70. The LAN I/F 67 is used so as to connect the printer 1 to a LAN (not shown). The operation keys 90 are disposed on the top surface of the case 2. As for the operation keys 90, known operation keys, including an enter key and a cancel key, are used.

The PC 70 also includes a CPU 71, a ROM 72, and a RAM 73. The CPU 71 is connected to a hard disc device (HDD) 74, an operation unit 75 including a key board and a mouse, a display unit 76 (such as a CRT), a printer port interface (printer port I/F) 77, and a LAN interface (LAN I/F) 78. The printer port I/F 77 is used so as to connect the PC 70 to the printer 1. The LAN I/F 78 is used so as to connect the PC 70 to a LAN (not shown). The printer 1 and the PC 70 may be connected via the LAN interfaces 67 and 78.

[Print Process]

Figure 5:
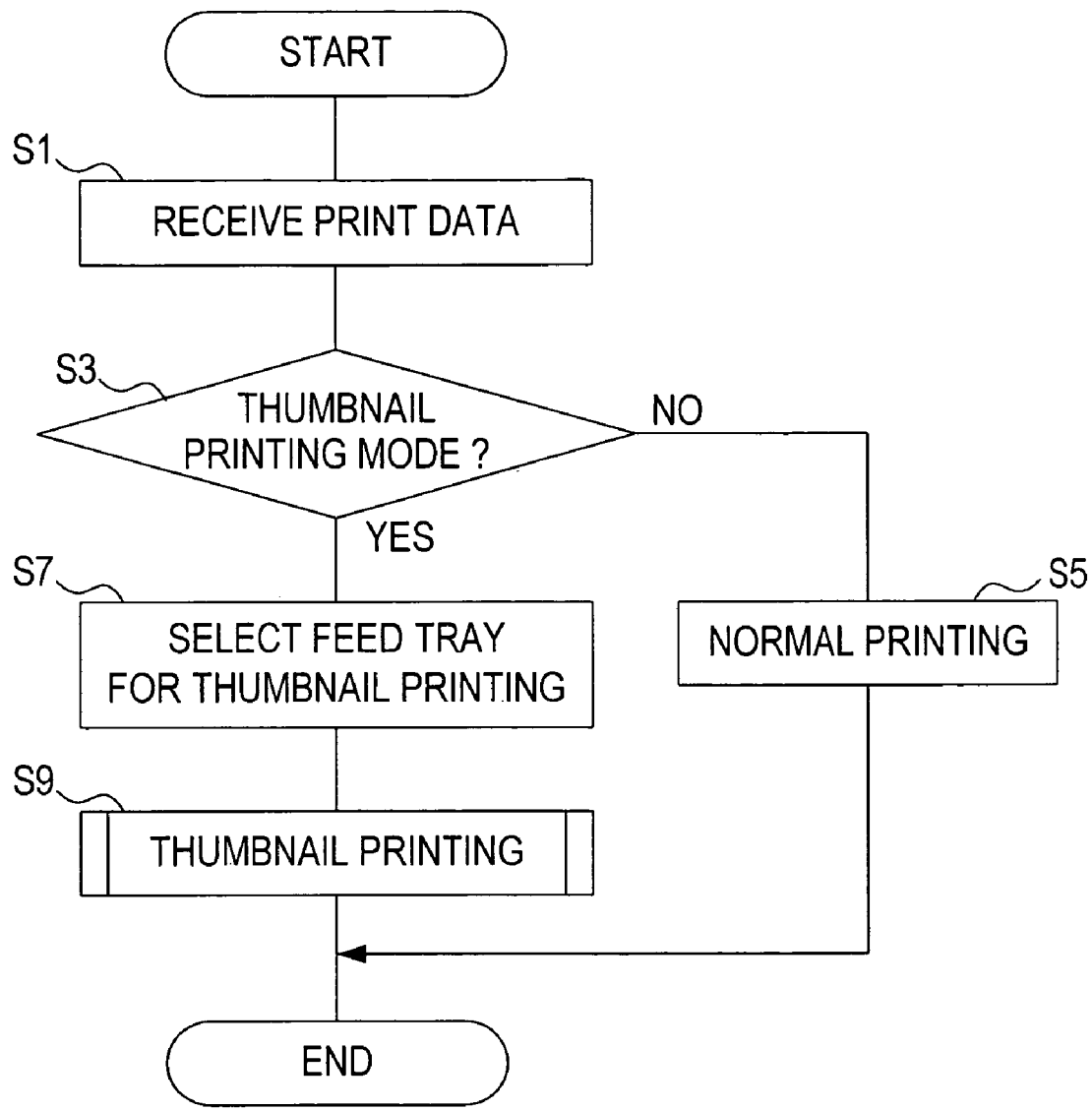
FIG. 5 is a flowchart describing the main routine of a print process performed by the printer according to the embodiment.

The following describes print process executed by the above-described control system. This process is initiated when print data is sent from the PC 70. As shown in FIG. 5, which describes the main routine of the print process, when the process is initiated, in S1 (S indicates "step", the same applies hereinafter) print data, sent from the PC 70, is received and stored in a predetermined area of the RAM 73. In S3, it is determined whether or not thumbnail printing is specified as a printing mode.

Figure 6:
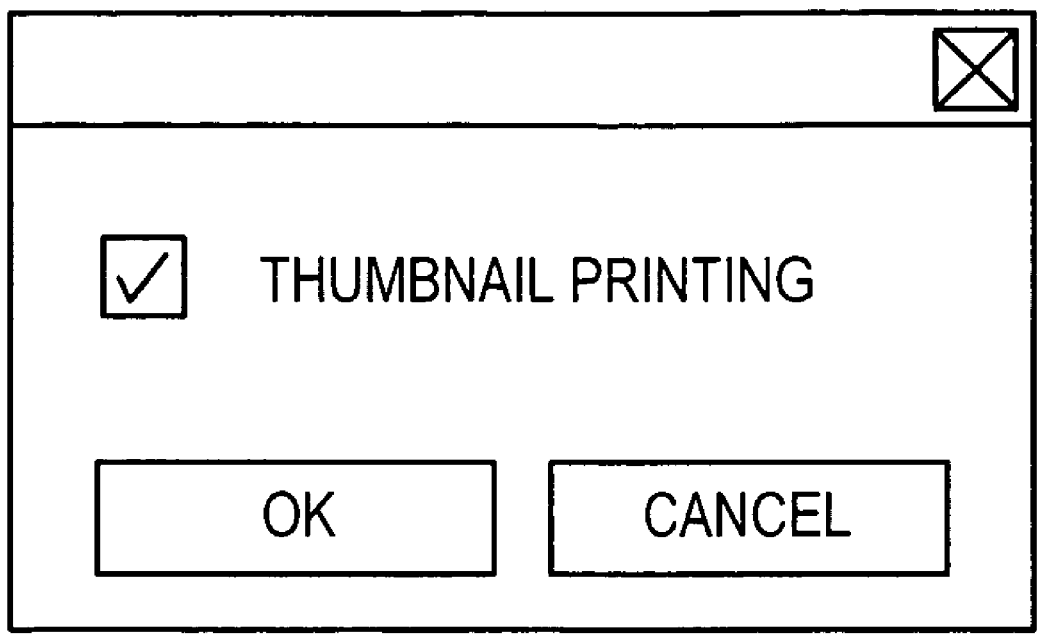
FIG. 6 is an explanatory view showing an example of a user interface for setting a thumbnail printing mode of the printer according to the embodiment.

In other words, when the print data is set from the PC 70 to the printer 1, a user interface, such as the one shown in FIG. 6, is displayed on the display unit 76 of the PC 70. When an input is made through the operation unit 75 in response to this display, data, which specifies whether or not thumbnail printing is selected, is attached to the print data to be sent to the printer 1. Based on the data, the determination is made in S3 whether or not thumbnail printing is selected for the printing mode. In stead of setting the thumbnail printing mode when printing is performed, the thumbnail printing mode may be preliminarily selected in PC 70.

If it is determined that thumbnail printing is not selected (S3:N), the process proceeds to S5 in which normal printing is performed corresponding to the print data received as described above. Then, the process is finished. On the other hand, if it is determined that the thumbnail printing is selected (S3:Y), in S7 one of the feed trays storing the above-described recording sheets 300 is selected among the main feed tray 6, the multi-purpose tray 14, and the additional feed tray 46. The feed tray for thumbnail printing is preliminarily selected by a user with the operation keys 90. In S9, the recording sheet 300 is fed from the selected feed tray, and thumbnail printing is performed. Then, the print process is finished.

Figure 7:
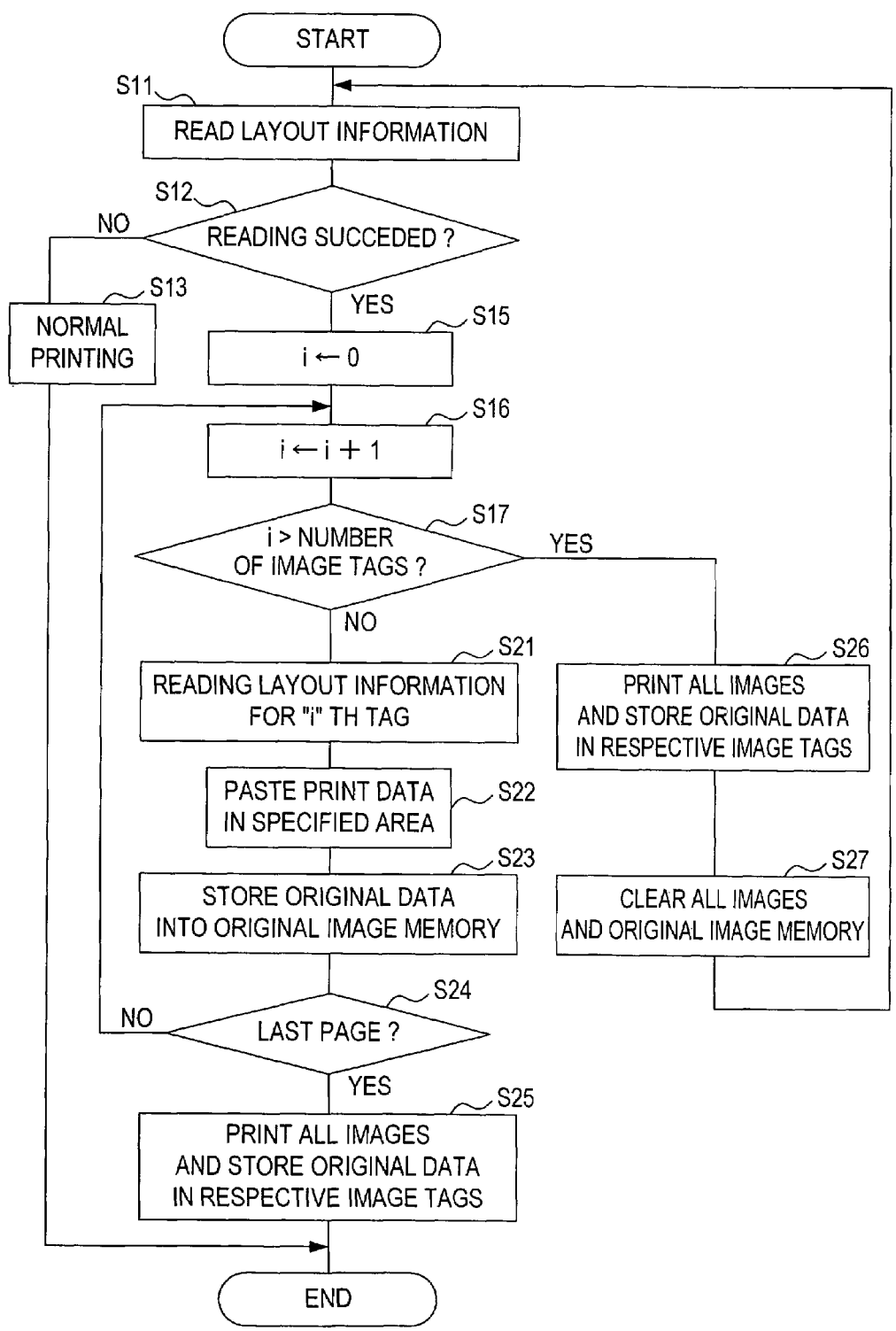
FIG. 7 is a flowchart describing the thumbnail printing process included in the print process performed by the printer according to the embodiment.
Figures 8, 9:
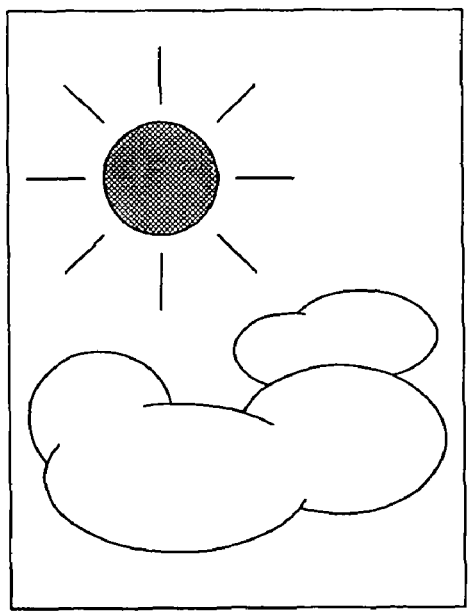
FIG. 8 is a table showing examples of layout information used in the thumbnail printing process.
FIG. 9 is an explanatory view showing an example of an image corresponding to print data.

With reference to FIG. 7, the thumbnail printing process will be described in detail. When the process is initiated, in S11 layout information is read from the layout tag 302 of the recording sheet 300 fed to the registration position. The layout information mentioned here means the information stored in the layout tag 302, as shown in FIG. 8. The layout information includes tag numbers, tag positions, and print positions associated with one another. The tag numbers are assigned to respective image tags 303. The tag positions indicate the respective positions of the image tags 303 in X-Y coordinates wherein the top left corner of the recording sheet 300 is set to be the original point. The print positions indicate the range of the respective areas 300a in the above-described X-Y coordinates. The layout information is read by the tag reader 16 in S11.

Referring again to FIG. 7, in S12 it is determined whether or not layout information has been successfully read. If it is determined that the reading has been failed (S12:N), in S13 normal printing is performed based on the received print data. Then the process is finished. A denial determination is made in S12 and normal printing is performed when, for example, a user, by mistake, places the ordinary recording sheet 3, such as bond paper, on the feed tray selected for thumbnail printing as described above.

On the other hand, if it is determined that the layout information has been successfully read (S12:Y), in S15 a value "i" in a counter is cleared to 0, and in S16 the value "i" is incremented by 1. In S17, it is determined whether or not the value in the counter "i" is larger than the number of the image tags 303 recognized by the layout information. When the process goes to S17 for the first time, i=1. Therefore, if the recording sheet 300 is provided with a plurality of image tags 303, a denial determination is made in S17, and the process proceeds to S21.

In S21, layout information (i.e. tag position and print position) is read from the image tag 302 with regard to the image tag 303 to which the tag number "i" is assigned. In S22, the print data for page "i" sent from the PC 70 is reduced and pasted as a thumbnail image (an index image), in one area of the recording sheet 300 virtually set in the RAM 63, which corresponds to the print position specified by the above-described layout information. In the pasting step, the print data for the page "i" is decoded, and the bitmap data thereof is loaded in the RAM 63. The bitmap data is scaled down and reduced so as to produce a thumbnail image. The thumbnail image is pasted in a predetermined area of the RAM 63 based on the print position in the layout information.

Figure 10:
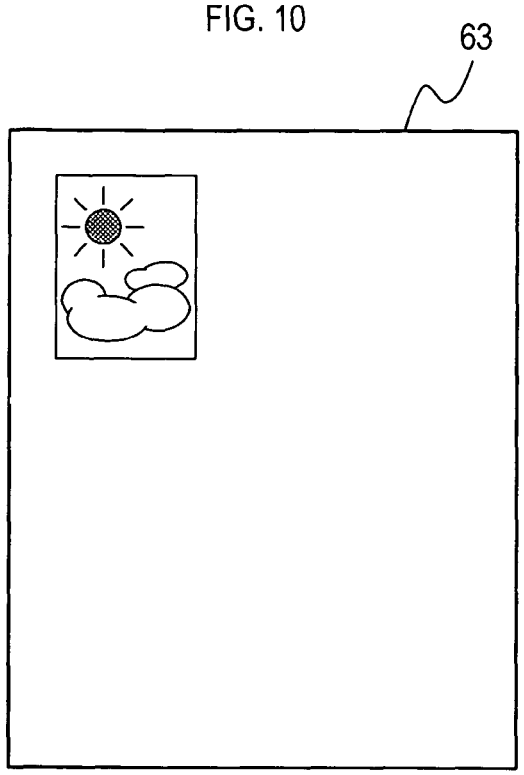
FIG. 10 is an explanatory view showing a state wherein the image, shown in FIG. 9, is reduced to a thumbnail and pasted on a predetermined area in a RAM of the printer according to the embodiment.

For example, if the print data for the page 1 corresponds to the image shown in FIG. 9, a thumbnail image (an index image) of this image is pasted as shown in FIG. 10 based on the layout information. Instead of reducing the print data, one portion of the print data (such as the data in vicinity of the center of the image) may be cut out and pasted. Subsequently, in S23, original data of the image in page "i", that is image data before being reduced, is saved in an original image memory provided in the RAM 63. In S24, it is determined whether or not the above-described page "i" is the last page.

If the page "i" page is not the last page (S24:N), the process goes back to the above-described S16, and the above-described steps are repeated. Every time the above-described steps are performed, "i" is incremented by 1. When the above-described steps are performed for the last page (S24:Y), the process proceeds to S25. In S25, all the thumbnail images, which have been pasted in the RAM 63 as described above, are printed by the image formation unit 93. The original data of respective thumbnail images is written by the tag writer 38 in the respective image tags 303 provided in the respective areas 303a. Then, the process is finished. The original data may be the print data sent from the PC 70. Alternatively, the original data may be a bitmap obtained after the print data is decoded, or data wherein the print data is still under decoding.

On the other hand, if the value of the counter "i" becomes larger than the number of the image tags 303 (S17:Y) while "i"th page is not yet the last page (S24:N), the process proceeds to S26. In S26, all the thumbnail images, which have been pasted, are printed by the image formation unit 93, and original data of respective thumbnail images is written by the tag writer 38 in the respective image tags 303 provided in the respective areas 300a. Subsequently, in S27 all the thumbnail images, pasted in the RAM 63, and the original image memory, stored in the RAM 63, are cleared. Then, the process goes to the above-described S11.

By this process, thumbnail images are printed in all the areas 300a in one recording sheet 300, and the original data of the thumbnail images is stored in the respective image tags 303 provided in respective areas 300a. Moreover, when the above-described process is over with respect to one recording sheet 300 (S27), the process is restarted from the step of reading layout information (S11). Therefore, even if a plurality of recording sheets 300 having deferent numbers of printing areas are placed on the above-described feed tray, printing of the above-described thumbnail images and recording of the original data can be suitably performed. The recording sheets 300 are sequentially conveyed and the above-described printing and recording are performed. When the process is performed for the last page (S24:Y), the above-described S25 is performed, and then the process is finished.

Figure 11:
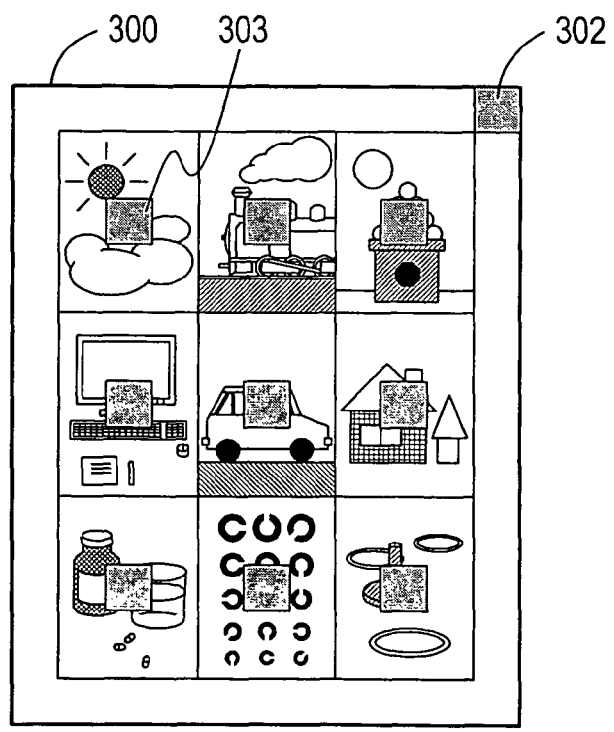
FIG. 11 is an explanatory view showing an example of a thumbnail printed by the thumbnail printing process.

As shown in FIG. 11, in each of the areas 300a, a thumbnail image (an index image) is printed based on print data for each page. In each of the image tags 303 provided in the respective areas 300a, the original data of the thumbnail image, printed in the area 300a where the image tag 303 is disposed, is stored.

The printer 1 reads the data stored in the image tags 303 by the tag reader 39 provided on the top surface thereof, and prints the images of desired pages, which are unreduced images, onto ordinary recording sheets 3. The following describes the reproduction print process with reference to FIG. 12.

Figure 12:
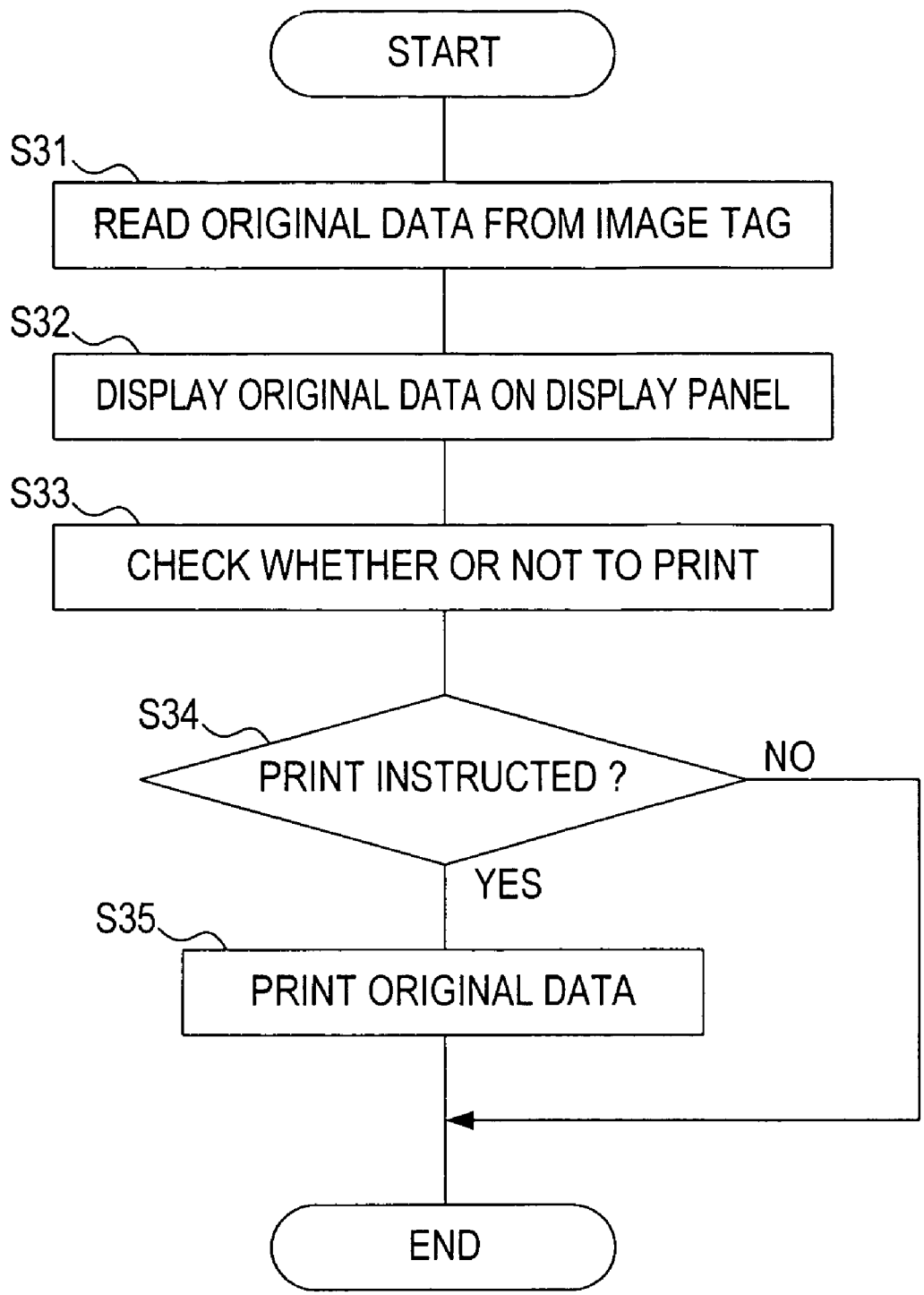
FIG. 12 is a flowchart describing a reproduction print process performed in the printer according to the embodiment.

The tag reader 39 constantly performs reading operation with respect to an RFID tag. When some kind of RFID tag is detected, this process is initiated. Alternatively, a particular type of code may be stored in the image tag 303 so that the process shown in FIG. 12 is initiated when the particular code is detected.

Figure 13:
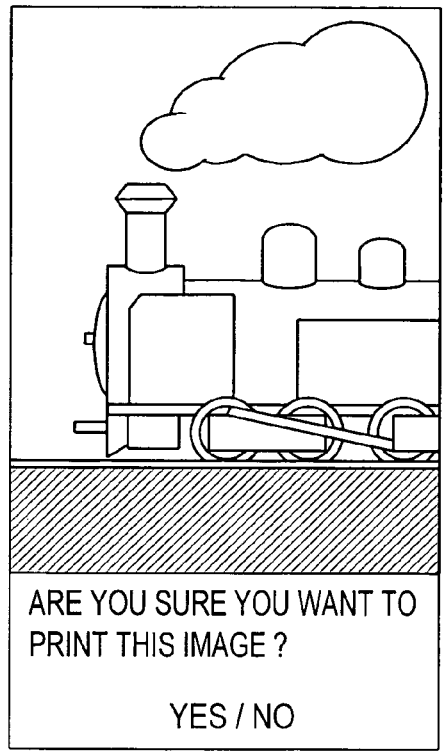
FIG. 13 is an explanatory view showing an example of an image shown in the reproduction print process on a display panel of the printer according to the embodiment.

When the process is initiated, in S31 the above-described original data is read from the image tag 303. In S32, an image corresponding to the original data is shown on the display panel 91 in a reduced manner. In S33, a user is asked whether or not printing is desired for the displayed image. Specifically, in S32 an image is shown on the display panel 91, for example, as shown in FIG. 13. In S33, a massage is shown in the lower portion of the displayed image so as to encourage the user to input whether or not printing for the displayed image is desired. FIG. 13 exemplifies a case wherein the image tag 303 disposed in the upper center area 300a in FIG. 11 is held over the tag reader 39. If the user affirms the message (YES), the user presses the enter key. If the user denies the message (NO), the user presses the cancel key.

Referring again to FIG. 12, in S34 it is determined whether or not printing is instructed by the above-described operation of the user. If printing is instructed (S34:Y), in S35 the above-described original data is printed without being reduced. If printing is canceled (S34:N), the process is finished. In the printing step in S35, a feed tray, which is different from the feed tray selected in the above-described S7, is selected. Printing is performed on an ordinary recording sheet 3, such as a bond paper.

Figure 14:
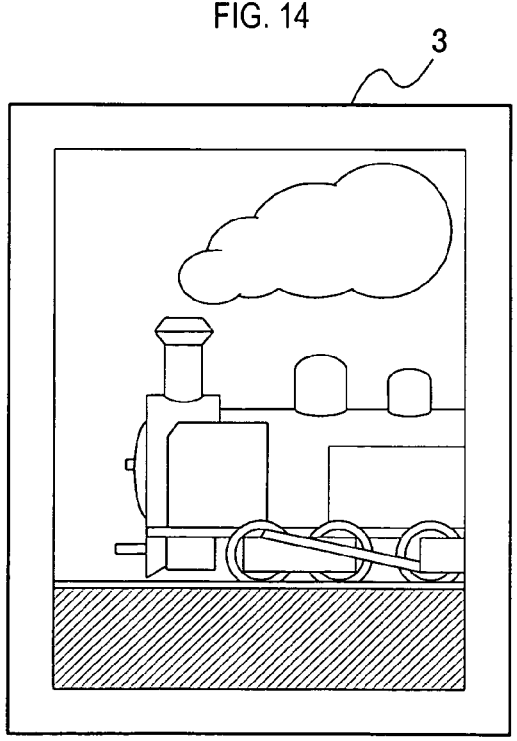
FIG. 14 is an explanatory view showing an example of a print result produced by the reproduction print process.

FIG. 14 shows an example wherein the image in the upper center area 300a in FIG. 11 is printed on an ordinary recording sheet 3 by the above-described process. In the present embodiment, since the original data is stored in the image tag 303 when a thumbnail is printed as an index image, an image of the original data can be easily reproduced and printed. Therefore, unnecessary consumption of the recording sheets 3 can be inhibited because not all the print data has to be printed. Moreover, an image of desired print data can be easily checked.

Figure 15:
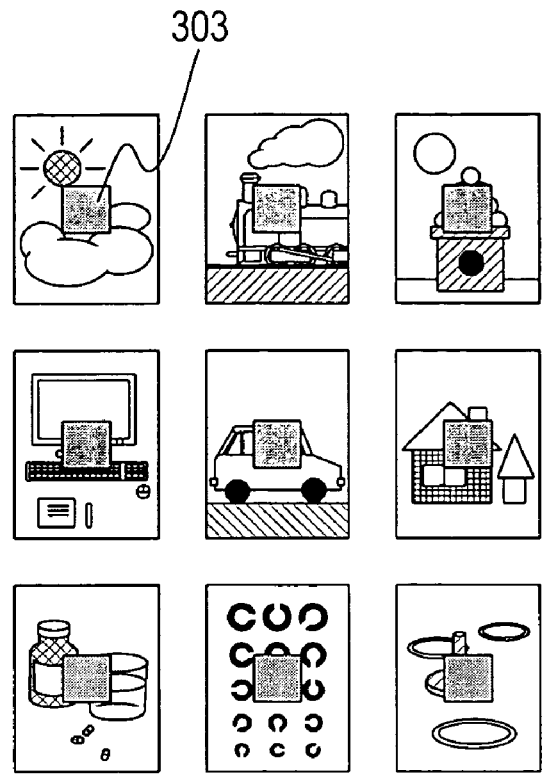
FIG. 15 is an explanatory view showing a state wherein a recording sheet is cut and respective thumbnails are separated from one another.

Furthermore, in the present embodiment, wrong printing can be suitably inhibited because a user can check an image to be printed in S33 and S34, before printing is performed in S35. Still furthermore, in the present embodiment, the tag reader 39 can easily read data in the image tags 303, since the tag reader 39 is disposed on the top surface of the main body of the printer 1. Moreover, in the present embodiment, the above-described reproduction printing can be easily performed even in a case wherein the recording sheet 300, on which thumbnail printing is performed, is cut into each area 300a, as shown in FIG. 15, since the image tags 303 are provided in respective areas 300a.

[Other Embodiment]

Figure 16:
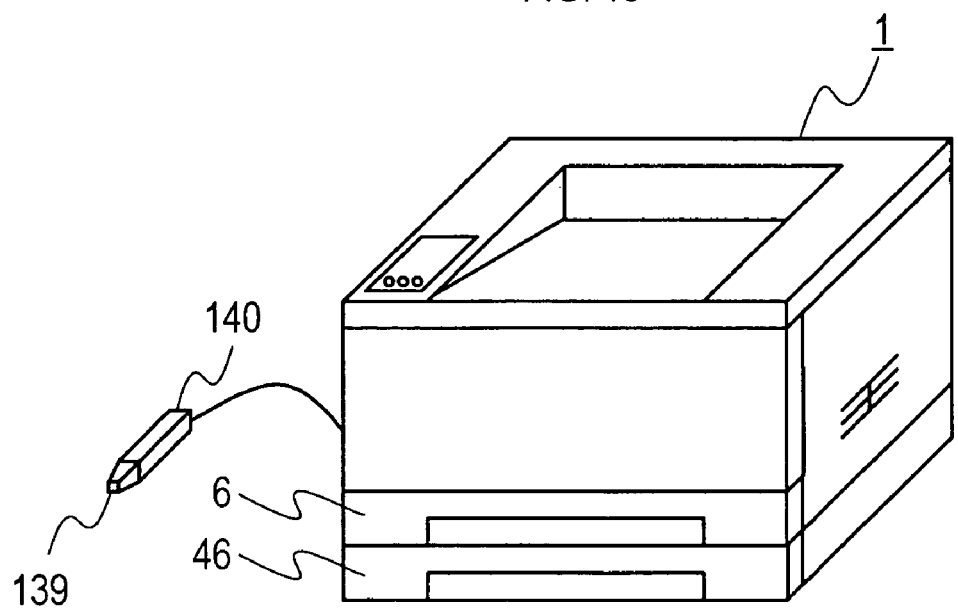
FIG. 16 is a perspective view showing a tag reader of the printer used for the reproduction print process according to a variation of the embodiment.

It is to be noted that the present invention is not limited to the above-described embodiment. Variations and modifications are possible without departing from the scope of the subject matter of the present invention. For example, the PC 70 and the printer 1 may be connected via Internet. A tag reader for reading data from the image tags 303 may be provided in the form of, for example, a tag reader 139, shown in FIG. 16, which is configured separately from the main body of the printer 1 and provided on a leading end of a pointer 140. In this case, data in the image tags 303 can be easily read by moving the pointer 140 to a suitable position.

Figure 17:
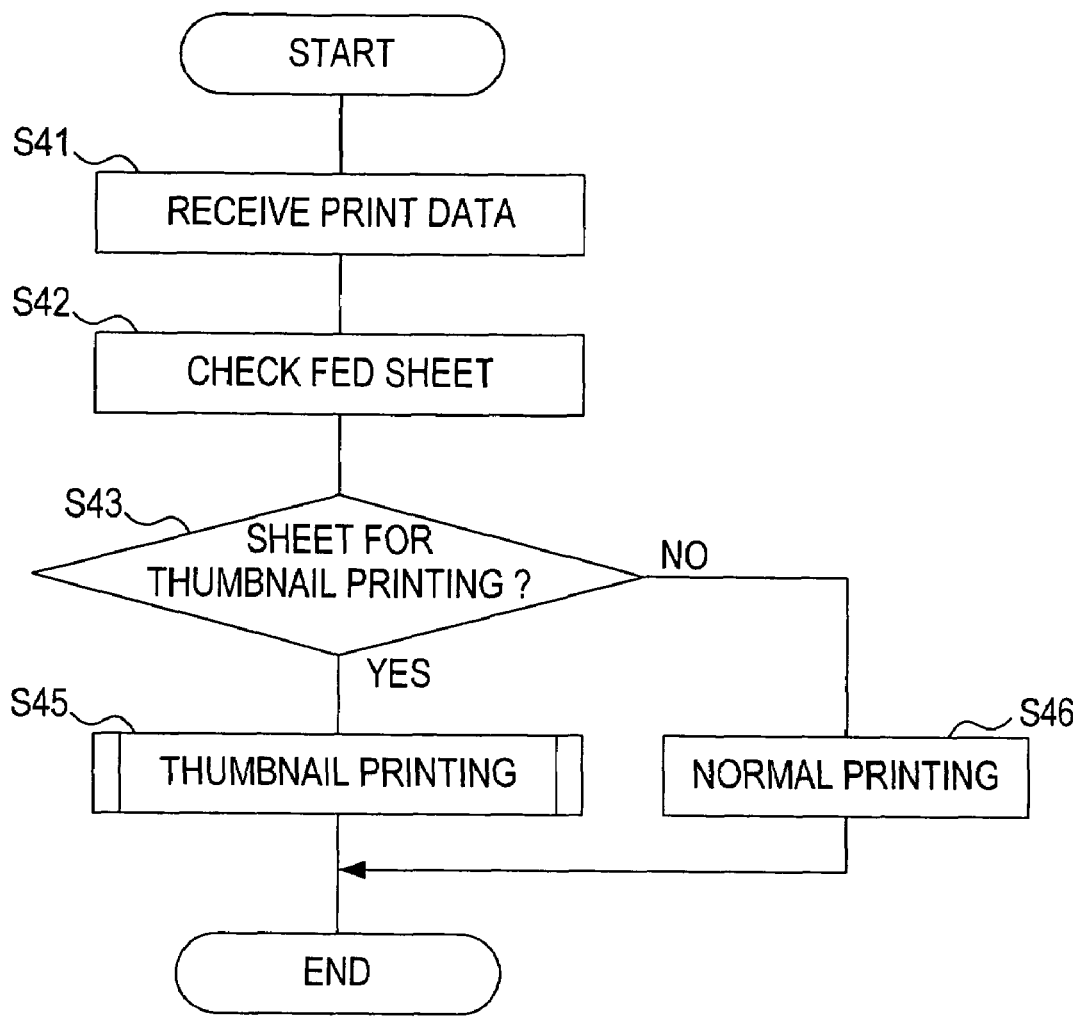
FIG. 17 is a flowchart describing a variation of the print process performed by the printer according to the embodiment.

Although whether or not to perform thumbnail printing is set via the PC 70 in the above-described embodiment, the setting may be changed, in the following manner, depending on the type of the recording sheet 3 placed in the printer 1. In this process, as shown in FIG. 17, in S41 print data is received from the PC 70. In S42, it is determined whether or not the recording sheet 3, conveyed up to the registration position, is provided with the layout tag 302.

In a case wherein the layout tag 302 is provided, it is determined in S43 that the recording sheet 300 for thumbnail printing is being conveyed (S43:Y). In S45, the above-described thumbnail printing is performed as shown in FIG. 7, and the process is finished. On the other hand, in a case wherein the layout tag 302 is not provided, it is determined in S43 that the recording sheet 300 for thumbnail printing is not used (S43:N). In S46, normal printing is performed, and the process is finished.

Whether or not to perform thumbnail printing may be also changed by changing feed trays in the side of the printer 1. Although varieties of known methods can be adopted for checking the present/absence of the layout tag 302 in S42, determination can be furthermore accurately made by storing a special identifier in the layout tag 302. The presence/absence of the layout tag 302 may be also checked, in the same manner as in S11 and S12 in FIG. 7, by performing the reading step (S11) to read out the layout information from the recording sheet 3 fed in the printer 1, and the determination step (S12) whether or not reading has been performed successfully. In this case, S11 and S12 in the thumbnail printing process (S45), performed when the recording sheet 300 for thumbnail printing is fed (S43:Y), can be skipped.

Furthermore, the present invention may be adopted, not only to a laser printer, but also to various image forming apparatus, such as a facsimile, a copier, an inkjet printer, a dot impact printer, and so on. Moreover, the tags 302 and 303 may be adhered to the recording sheet 300 by using an adhesive, or embedded into the recording sheet 300. The tags 302 and 303 may be disposed on a side of the recording sheet 300 on which printing is performed, or on a back side thereof. Furthermore, the storing device may be configured with a barcode or the like. If the dispositions of the image tags 303 are standardized, and recording sheets 300 provided with tags 303 in the standardized disposition are commercially available, the layout information stored in the storing device may simply be format information which specifies the standard. Moreover, the first storing medium provided to the recording sheet 300 may be only one, such as one image tag 303.

Although the specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

What is claimed is:

1. An image forming apparatus comprising:
a printing unit that performs printing on a recording sheet based on print information, the recording sheet including a plurality of print areas,
a positional information reader that reads positional information with regard to a first storing medium and information on print positions indicating ranges of the print areas from a second storing medium that stores the positional information with regard to the first storing medium and the information on the print positions indicating the ranges of the print areas, the first and the second medium provided to the recording sheet;
a first controller that controls the printing unit based on the information on print positions, read by the positional information reader, so as to print an image, corresponding to the print information, in a position on a recording sheet according to the information on print positions; and
the first controller includes a counter that counts a value each time an image corresponding to the print information and the information on print positions are associated with each other,
wherein when the first controller determines that the image corresponding to the print information is a last image, or when the first controller determines that the value in the counter is larger than a number of the first storing medium recognized by the information on the print position, the printing unit starts printing.

2. The image forming apparatus as set forth in claim 1 further comprising a print information reader that reads print information stored in the first storing medium provided to the recording sheet
wherein the first controller controls the printing unit based on the print information, read by the print information reader, so as to print an image corresponding to the print information in a position on a recording sheet according to the information on the print positions.

3. The image forming apparatus as set forth in claim 1 further comprising:
a print information reader that reads print information stored in the first storing medium provided to the recording sheet; and
a second controller that controls the printing unit based on the print information, read by the print information reader, so as to print an image, corresponding to the print information, on another recording sheet.

4. The image forming apparatus as set forth in claim 3 further comprising:
a first holder that holds a recording sheet on which printing is performed by control of the first controller; and
a second holder that holds a recording sheet on which printing is performed by control of the second controller.

5. The image forming apparatus as set forth in claim 2 wherein an image printed by control of the first controller is an index image that indicates an original image.

6. The image forming apparatus as set forth in claim 5 further comprising a print information writer that writes the print information of the original image of the index image into the first storing medium disposed in a position where the index image is printed, when the first controller controls printing of the index image.

7. The image forming apparatus as set forth in claim 2 wherein an image printed by control of the first controller is an original image.

8. The image forming apparatus as set forth in claim 2 wherein the print information reader is disposed on a top surface of a main body of the image forming apparatus.

9. The image forming apparatus as set forth in claim 2 wherein the print information reader is provided separately from a main body of the image forming apparatus.

10. The image forming apparatus as set forth in claim 2
wherein the recording sheet comprises a plurality of the first storing media, and
wherein the second storing medium stores positional information regarding each of the plurality of the first storing media.

11. An image forming method for performing printing on a recording sheet, the recording sheet including a first storing medium in which print information is adapted to be stored and including a plurality of print areas, and a second storing medium in which positional information regarding the first storing medium and information on print positions indicating ranges regarding the plurality of print areas is adapted to be stored, the method comprising steps of:
reading the positional information and the information on print positions stored in the second storing medium;
counting a value each time an image corresponding to the print information and the information on print positions are associated with each other; and
performing first printing in which an image, corresponding to the print information, is printed in a position according to the information on print positions read in the positional information reading step after determining that the image corresponding to the print information is a last image, or determining that the counted value is larger than a number of the first storing medium recognized by the information on the print position.

12. The image forming method as set forth in claim 11 further comprising steps of:
reading the print information from the first storing medium; and
performing second printing in which an image corresponding to the print information is printed on another recording sheet based on the print information read in the print information reading step.

13. An image forming apparatus comprising:
a printing unit that performs printing on a recording sheet based on print information, the recording sheet including a plurality of print areas;
a positional information reader that reads positional information with regard to a first storing medium and information on print positions indicating ranges of the print areas from a second storing medium that stores the positional information with regard to the first storing medium and the information on the print positions indicating the ranges of the print areas, the first and the second medium provided to the recording sheet;
a first controller that controls the printing unit based on the information on print positions, read by the positional information reader, so as to print an image corresponding to the print information, in a position on a recording sheet according to the information on print positions, the first controller including a counter that counts a value each time an image corresponding to the print information and the information on print positions are associated with each other;
a print information reader that reads print information stored in the first storing medium provided in the recording sheet; and
a second controller that controls the printing unit based on the print information read by the print information reader and prints an image corresponding to the print information on another recording sheet,
wherein when the first controller determines that the image corresponding to the print information is a last image, or when the first controller determines that the value in the counter is larger than a number of the first storing medium recognized by the information on the print position, the printing unit starts printing.

14. An image forming apparatus comprising:
a printing unit that performs printing on a recording sheet based on print information, the recording sheet including a plurality of print areas;
a positional information reader that reads positional information with regard to a first storing medium and information on print positions indicating ranges of the print areas from a second storing medium that stores the positional information with regard to the first storing medium and the information on the print positions indicating the ranges of the print areas, the first and the second medium provided to the recording sheet;
a first controller that controls the printing unit based on the information on print positions, read by the positional information reader, so as to print an image corresponding to the print information, in a position on a recording sheet, to which the second medium is provided, according to the information on print positions, the first controller including a counter that counts a value each time an image corresponding to the print information and the information on print positions are associated with each other,
a print information reader that reads print information stored in the first storing medium provided in the recording sheet; and
a second controller that controls the printing unit based on the print information read by the print information reader and prints an image corresponding to the print information on another recording sheet to which none of the first medium and the second medium is provided,
wherein when the first controller determines that the image corresponding to the print information is a last image, or when the first controller determines that the value in the counter is larger than a number of the first storing medium recognized by the information on the print position, the printing unit starts printing.

* * * * *